Aug. 3, 1943.   A. W. GUSTAFSON   2,325,674
SUCTION CONTROLLED FILLING ATTACHMENT FOR TRACTOR FUEL TANKS
Filed May 23, 1940   2 Sheets-Sheet 1
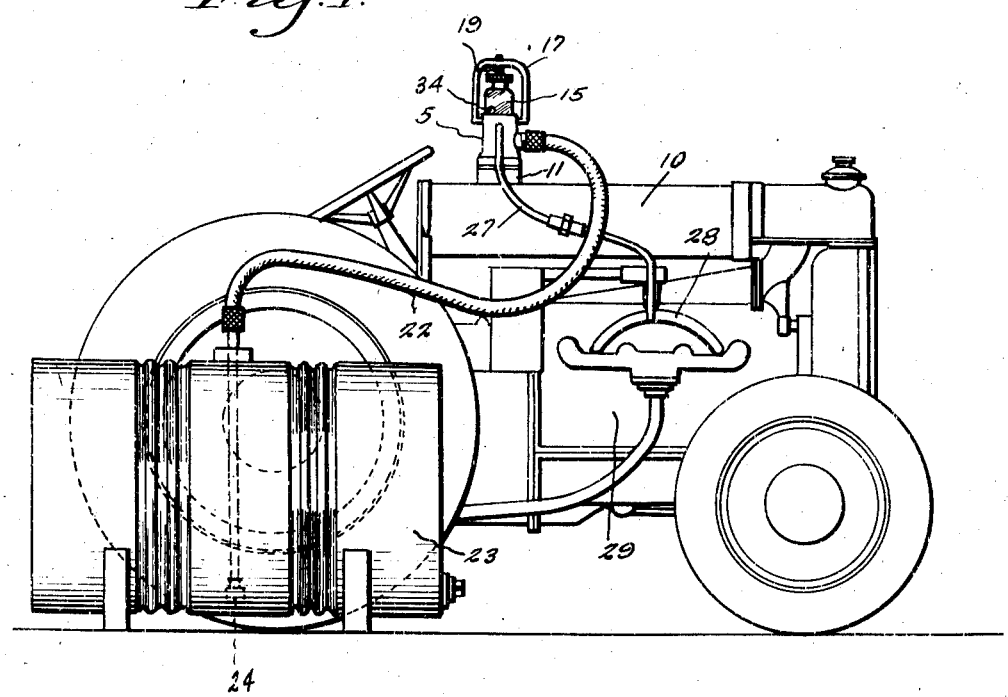
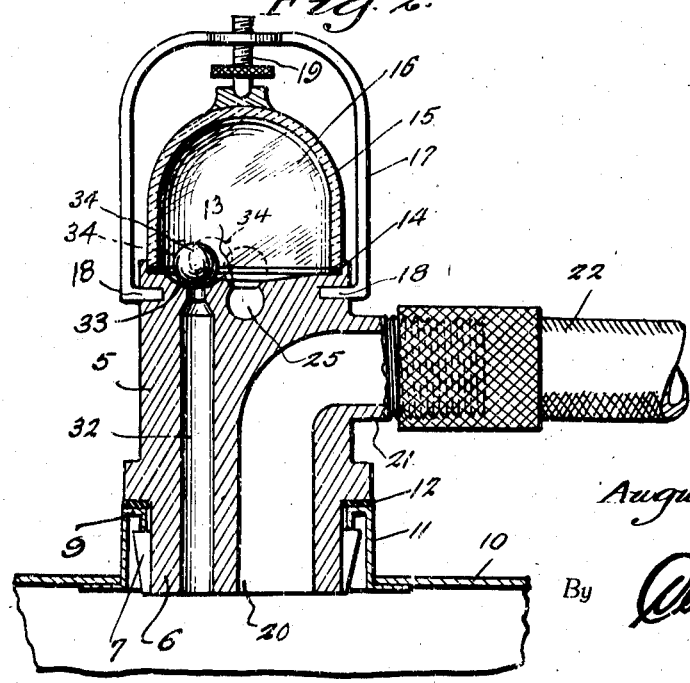
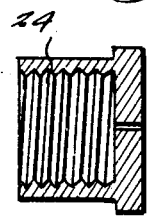
Inventor
August W. Gustafson
By Clarence A. O'Brien
Attorneys Aug. 3, 1943.  A. W. GUSTAFSON  2,325,674
SUCTION CONTROLLED FILLING ATTACHMENT FOR TRACTOR FUEL TANKS
Filed May 23, 1940   2 Sheets-Sheet 2
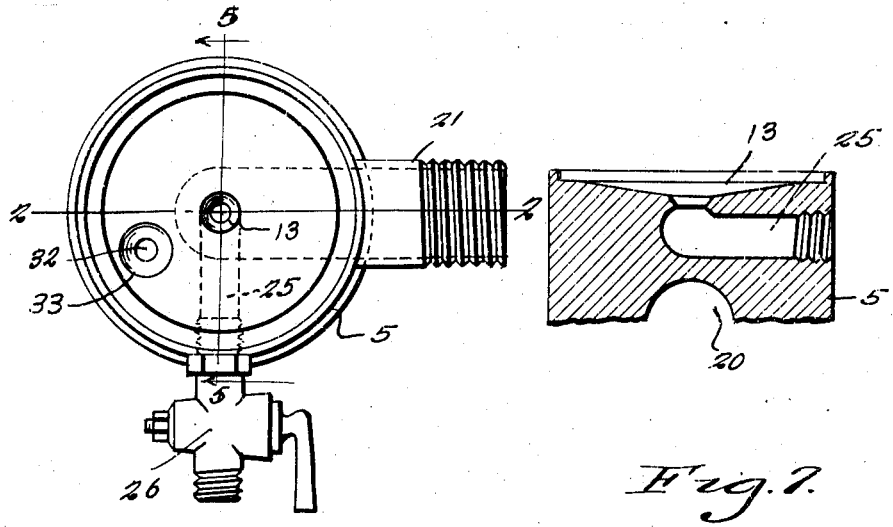
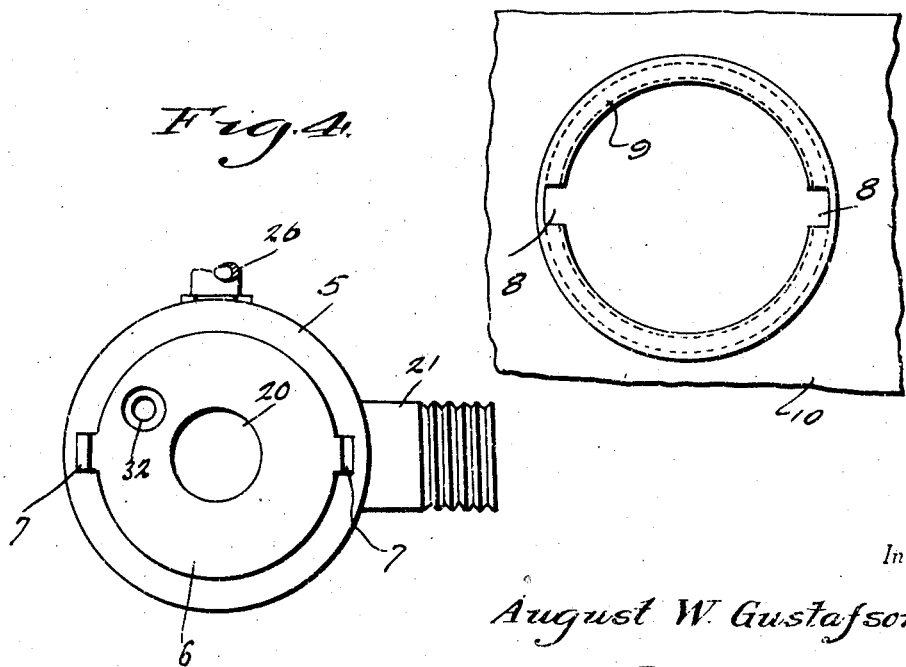
Inventor
August W. Gustafson
By Clarence A. O'Brien
Attorneys

Patented Aug. 3, 1943

2,325,674

UNITED STATES PATENT OFFICE 2,325,674

SUCTION CONTROLLED FILLING ATTACHMENT FOR TRACTOR FUEL TANKS

August W. Gustafson, Hutto, Tex., assignor, by direct and mesne assignments, of one-half to Gus R. Lundelius, Round Rock, and one-fourth to Charles V. Lansberry, Round Tree, Tex.

Application May 23, 1940, Serial No. 336,862

5 Claims. (Cl. 226—116)

The present invention relates to new and useful improvements in means for filling the fuel tanks of tractors from a barrel or tank, and has for its primary object to provide a suction line leading from the intake manifold of the tractor to the tank or supply barrel and embodying a suction controlled valve structure attachable to the filling neck of the fuel tank of the tractor to automatically cut off the supply of fuel when the fuel tank has been filled.

A further object of the invention is to provide a filling attachment of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view showing the connection leading from the supply drum or tank to the fuel tank of the tractor, Figure 2 is a vertical sectional view through the filler connection, taken substantially on a line 2—2 of Figure 3 with the glass dome removed, Figure 3 is a top plan view with the glass dome removed from the filler connection, Figure 4 is a bottom plan view thereof, Figure 5 is a fragmentary vertical sectional view taken substantially on a line 5—5 of Figure 3, Figure 6 is a longitudinal sectional view through the intake cap for the filler hose, and Figure 7 is a top plan view of the filler neck for the fuel tank of the tractor.

Referring now to the drawings in detail, wherein for the purpose of illustration I have disclosed a preferred embodiment of the invention, the numeral 5 designates the body of the filler connection which has a reduced lower end 6 provided with lugs 7 at diametrically opposite sides for insertion in the notches 8 of the filler neck 9 of a fuel tank 10 and adapted for camming engagement under the downturned flange 11 of the filler neck to tightly secure the body of the filler connection in position in the tank. A gasket 12 is provided between the upper edge of the neck of the tank and the body 5 to provide an air-tight seal therebetween.

The body 5 is of generally cylindrical form and is provided with a concaved upper surface formed with an upstanding flange or wall 14 within which a glass dome 15 is snugly fitted. The dome 15 provides a chamber 16 above the top of the body 5 and the dome is secured in position by a wire bail 17 having its ends 18 inturned and inserted in the recesses in the upper portion of the body 5. The bail is of substantially U-form and extends across the top of the dome 15 and is provided with a locking set screw 19 bearing against the top of the dome.

The body 5 is provided with a filler passage 20 extending through the bottom of the body and outwardly through one side wall thereof and provided with a nipple 21 to which a hose 22 is attached, the hose extending into a drum or tank 23 and is provided at its inner end with a perforated intake cap 24.

Also extending laterally through a wall of the body 5 is a passage 25 which communicates at its inner end with the center of the concaved portion 13 of the body and has a valve structure 26 of conventional form connected to its outer end and to which a hose or pipe 27 is attached leading to the intake manifold 28 of the engine 29 of the tractor.

A third passage 32 extends vertically through the body 5 and has a valve seat 33 formed at its upper end, the passage 32 being eccentric in the body. Normally seated on the valve seat 33 is a ball 34 which closes communication through the passage 32.

In the operation of the device with the connector 5 fitted in the filler neck of the fuel tank 10 and with the valve 26 open, the suction from the intake manifold 28 of the engine will evacuate air from the chamber 16, the suction created in the dome causing a slight unseating of the ball into the dotted line position shown in Figure 2 and thus open the passage 32 to evacuate air from the tank 10 and drawing the fuel upwardly from the tank 23 into the tank 10 through the passage 20. When the tank 10 has been filled, the fuel will rise in the passage 32, completely unseating the ball 34 which will roll upon the opening 13 at the center of the concaved upper surface of the connector and thus automatically cut off communication with the suction passage 25 and prevent further flow of the fuel to the tank 10.

It is believed the details of construction, advantages and manner of use of the device will be readily understood from the foregoing without further detailed explanation.

What I claim is:

1. A filler connector for fuel tanks of motor vehicles comprising a body member adapted for air tight engagement with the tank, said body having a concaved upper surface, cover means for the top of the member cooperating with the member to provide an air chamber on top of the body, said body having a passage communicating with the chamber at the lowermost point of the concaved surface of the body, said body having a second passage providing communication between the tank and the chamber at a point in the upper surface of the body above the horizontal plane of said first passage, a suction pipe connected to the first named passage for evacuating air from the tank and from the chamber, said body also having a fuel passage, a pipe connecting said fuel passage with a source of supply for feeding fuel to the tank by the suction created in the chamber and a captive valve in the chamber normally closing the second passage in the body and adapted to be unseated from said second passage for gravitating into position for closing said first named passage by fuel rising in the second named passage.

2. A filler connector for fuel tanks of motor vehicles comprising a body member adapted for air tight engagement with the tank, said body having a concaved upper surface, a dome-shaped transparent hollow cover positioned on the body and cooperating therewith to provide an air chamber at the top of the body, said body having a vertical passage with its upper end terminating in the upper surface of the body at a point above the horizontal plane of the lowermost point of the concaved surface of the body and providing communication between the tank and the chamber, a suction pipe connected to the chamber at the lowermost point of the concaved upper surface of the body for evacuating air from the tank and from the chamber, said body also having a fuel passage, a pipe connecting the fuel passage with a source of supply for feeding fuel to the tank by the suction created in the chamber and a captive valve in the chamber normally closing the first named passage in the body and adapted to be unseated therefrom for gravitating into position for closing communication through said suction pipe by fuel rising in the first named passage.

3. A filler connector for fuel tanks of motor vehicles comprising a body member adapted for air tight engagement with the tank, said body having a concaved upper surface, a dome-shaped transparent hollow cover positioned on the body and cooperating therewith to provide an air chamber at the top of the body, said body having a lateral passage communicating with the chamber at the center of the concaved upper surface, said body having a passage with its upper end terminating at a point above the horizontal plane of the first named passage and providing communication between the tank and the chamber, a suction pipe connected to said lateral passage for evacuating air from the tank and from the chamber, said body also having a fuel passage, a pipe connecting the fuel passage with a source of supply for feeding fuel to the tank by the suction created in the chamber and a captive valve in the chamber normally closing the second passage in the body and adapted to be unseated therefrom for gravitating into position for closing said first named passage by fuel rising in the second named passage.

4. An automatic cut-off for a fuel tank filler of a motor vehicle, said fuel tank being provided with a filler neck, a feed conduit extending from a fuel reservoir, a connector having an air-tight fit in said filler neck and provided with a fuel passage having one end of said conduit attached thereto, an air chamber provided in the connector, the bottom of the chamber being concaved, said connector having a passage connecting the chamber with the tank and said connector also having a passage communicating with the chamber and having a manually controlled valve, said last-named passage terminating at one end in the bottom of the chamber at the lowermost point of said concaved bottom of the chamber and said first-named passage terminating at one end in said bottom of the chamber at a point above the horizontal plane of said second-named passage, a conduit connecting the intake manifold of the engine with the last-named passage to evacuate air from the tank and from the chamber, and valve means in the chamber normally seated on the upper end of the first-named passage to close the latter and responsive to direct action of overflow of fuel entering the chamber from the tank for unseating said last-named valve means for gravitating into position to close said last-named passage.

5. A filler connector for fuel tanks of motor vehicles comprising a body member having a concaved upper surface and adapted for air tight engagement with the tank, a member mounted on the body having a concaved underside providing a chamber on top of the body, said body having a passage communicating with the chamber at the lowermost point of the concaved surface of the body, said body having a second passage providing communication between the tank and the chamber at a point in the upper surface of the body above the horizontal plane of said first passage, a suction pipe connected to the first-named passage for evacuating air from the tank and from the chamber, said body also having a fuel passage, a pipe connecting said fuel passage with a source of supply for feeding fuel to the tank by the suction created in the chamber and a captive valve in the chamber normally closing the second passage in the body and adapted to be unseated from said second passage for gravitating into position for closing said first named passage by fuel rising in the second named passage.

AUGUST W. GUSTAFSON.